US011147014B2

(12) United States Patent
Patwardhan et al.

(10) Patent No.: US 11,147,014 B2
(45) Date of Patent: Oct. 12, 2021

(54) WAKE-UP RADIO GROUP-ID ALLOCATION

(71) Applicant: Hewlett Packard Enterprise Development LP, Houston, TX (US)

(72) Inventors: Gaurav Patwardhan, Santa Clara, CA (US); Eldad Perahia, Park City, UT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/784,636

(22) Filed: Feb. 7, 2020

(65) Prior Publication Data
US 2021/0250861 A1    Aug. 12, 2021

(51) Int. Cl.
*H04W 52/02*  (2009.01)
*H04W 4/021*  (2018.01)
*H04W 76/11*  (2018.01)

(52) U.S. Cl.
CPC ....... *H04W 52/0219* (2013.01); *H04W 4/021* (2013.01); *H04W 52/0229* (2013.01); *H04W 76/11* (2018.02)

(58) Field of Classification Search
CPC ......... H04W 52/0219; H04W 52/0229; H04W 76/11; H04W 4/021
USPC ...................................................... 370/318
See application file for complete search history.

(56) References Cited

U.S. PATENT DOCUMENTS

| | | | |
|---|---|---|---|
| 2014/0211707 A1* | 7/2014 | Chen | H04W 76/11 370/329 |
| 2015/0003422 A1* | 1/2015 | Jin | H04W 72/042 370/335 |
| 2016/0278013 A1* | 9/2016 | Shellhammer | H04W 84/12 |
| 2018/0359704 A1* | 12/2018 | Li | H04W 52/0219 |
| 2019/0045445 A1* | 2/2019 | Huang | H04W 72/0446 |
| 2019/0090192 A1* | 3/2019 | Liu | H04W 52/028 |
| 2019/0098574 A1* | 3/2019 | Huang | H04W 52/0219 |
| 2019/0200295 A1* | 6/2019 | Hartman | H04W 52/0235 |
| 2019/0313337 A1* | 10/2019 | Wilhelmsson | H04L 5/0048 |
| 2020/0245137 A1* | 7/2020 | Chitrakar | H04W 12/04 |
| 2021/0058748 A1* | 2/2021 | Liao | H04W 76/11 |

FOREIGN PATENT DOCUMENTS

JP    WO 2019/202955 A1 *  4/2018   ............ H04W 52/02

OTHER PUBLICATIONS

Lopez-Aguilera et al. "IEEE 802.11 Enabled Wake-up Radio", Dec. 2019, Sensors, vol. 20, 16 pages (Year: 2019).*

(Continued)

*Primary Examiner* — Mong-Thuy T Tran
(74) *Attorney, Agent, or Firm* — Hewlett Packard Enterprise Patent Department

(57) ABSTRACT

A method for wake-up radio group ID (GID) allocation includes generating, by an access point and prior to a station associating to the access point, a first Group-ID and a second Group-ID, wherein the station comprises a Wake-Up Radio, receiving, by the access point, a request from the station to associate, determining, by the access point, whether the station belongs in the first Group-ID or the second Group-ID, assigning, by the access point and based on the determining, the station to the first Group-ID, and sending, by the access point, a Wake-Up Packet to the Wake-Up Radio of the station using the first Group-ID.

17 Claims, 5 Drawing Sheets

(56) References Cited

OTHER PUBLICATIONS

Deng et al. "IEEE 802.11ba: Low Power Wake-up Radio for Green IoT", Jul. 2019, IEEE Communications Magazine, 7 pages (Year: 2019).*

Aboul-Magd et al., "A CSD Proposal for Wake-up Radio (WUR)", IEEE 802.11-16/0936r4, Jul. 24, 2016, 6 pages.

Azizi et al., "A PAR Proposal for Wake-up Radio", IEEE 802.11-16/1045r09, Jul. 28, 2016, 4 pages.

Park et al., "Proposal for Wake-Up Receiver (WUR) Study Group", IEEE 802.11-16/0722r1, Intel Corporation, May 18, 2016, 14 pages.

Po-Kai Huang, "Specification Framework for TGba", IEEE 802.11-15/0132r1511, Mar. 26, 2018, 18 pages.

Yu et al., "WUR Usage Model Document", IEEE 802.11-17/0029r10, Sep. 13, 2017, 23 pages.

* cited by examiner

WAKE-UP RADIO GROUP-ID ALLOCATION

DESCRIPTION OF RELATED ART

The explosion and proliferation of wireless-networked electronic devices in everything from inventory tags to appliances has led to increasing demand for small battery-powered devices with low power consumption and long battery life. These devices, often referred to collectively as the "Internet of Things" (IoT), currently employ simple low-power network protocols such as Bluetooth Low Energy (BLE), Zigbee, and the like. But for a variety of reasons designers would like to use Wi-Fi instead. Up to now the primary drawback with Wi-Fi has been relatively higher power consumption, leading to shorter battery life for IoT devices. The primary driver of this higher power consumption is the need for the Wi-Fi radio to be active constantly to listen for Wi-Fi management frames. For low duty cycle applications like asset tracking, this type of overhead dramatically reduces battery standby time.

Ways to further reduce power consumption are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
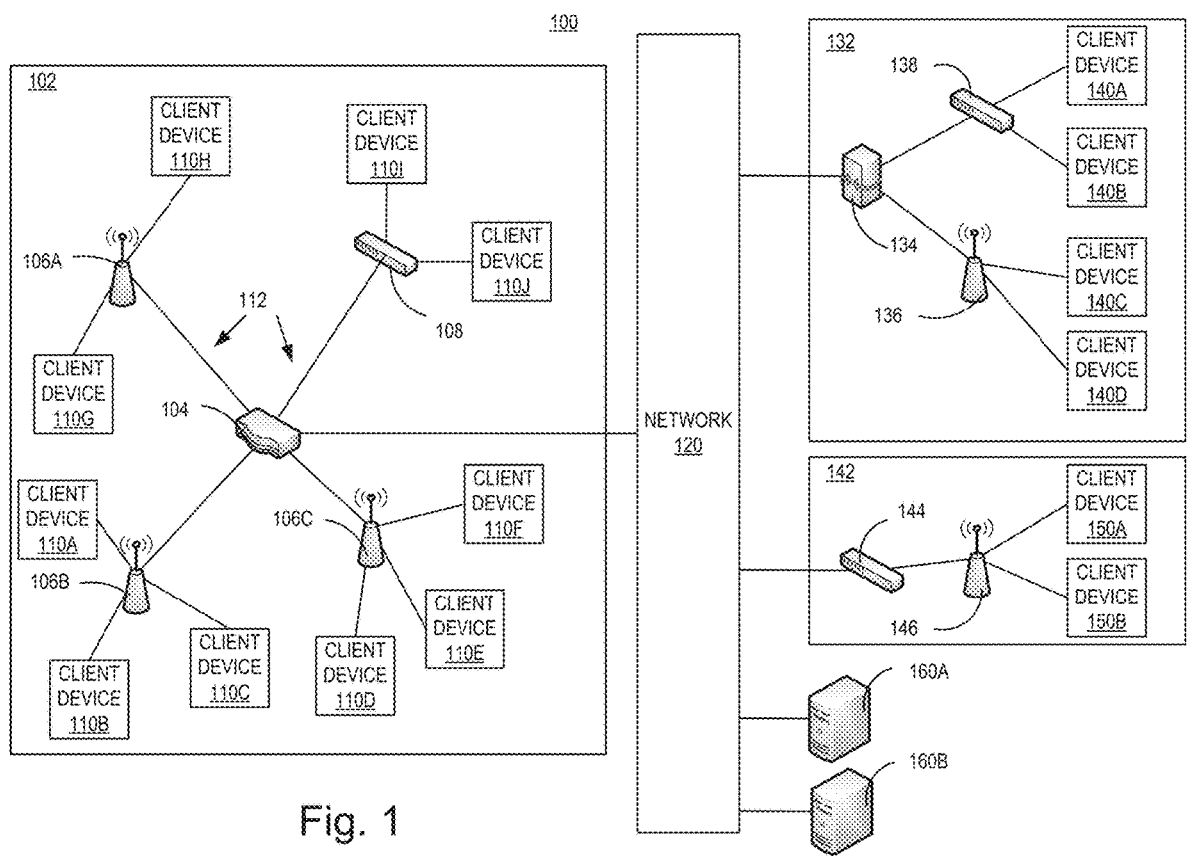
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

To understand the present invention, some background description and details must be given. Familiarity with Institute of Electrical and Electronics Engineers (IEEE) 802.11 in general is assumed, although some relevant, specific details are discussed below.

In 2016, the IEEE 802.11 Working Group started a new Task Group called "TGba" for creating an amendment to the IEEE 802.11 standard focusing on standardizing a specification for a Wake-Up Radio (WUR) to address use cases related to the desire to use Wi-Fi while minimizing power usage in Internet of Things (IoT) devices and other devices. The use cases address scenarios where the 802.11 radio has to be in deep sleep state with minimal power consumption.

The WUR is a station-side (STA) companion radio to the main 802.11 radio (also known as Primary Communication Radio or PCR). It operates in a receive (Rx) only mode and consumes extremely low power. The major power savings for the WUR when compared to PCR come from the 4 MHz operational bandwidth. The WUR's main purpose is to wake up the PCR on the STA when it receives a Wake-up packet sent by the access point to which the device is associated. The WUR can operate in two primary modes: 1.) Always On: The WUR Rx remains ON all the time; and 2.) Duty-cycled mode: The WUR Rx operates in a duty-cycled mode, in which it is ON for a certain duration and in a doze state for the rest of the duty cycle.

Although the main function of the WUR is to receive the wake-up packet and then wake up the PCR, a few other packets sent by the AP are required to be heard and processed by the WUR to maintain certain desirable states for its working. These packets include: 1.) Beacon: periodically sent by the access point, used for timing synchronization function at the STA; and 2.) Discovery Frame: periodically sent by the access point, this frame is for the STA to discover the different Basic Service Sets (BSS).

A single access point sends both of these frames on different 20 MHz channels (in traditional 802.11 parlance) and with different periodicity. After the PCR associates to the access point through the normal 802.11 association phase, the WUR's operating parameters are negotiated through the existing 802.11 Action frame exchange. This process is called the "WUR Negotiation Phase." These parameters include but are not limited to the Wake-UP ID (WID), Group-ID (GID), duty cycle operation parameters, etc. After negotiating the parameters for the WUR operation, the STA may choose to go to the sleep mode based on various conditions. The WUR in this state operates in one of the two primary modes mentioned above (i.e., always on or duty-cycled) until it receives a wake-up packet and consequently wakes up the PCR.

As explained above, the GID is assigned to STAs by the access point during the WUR negotiation phase. A STA can be assigned multiple GIDs. The function of GID is used for waking up multiple STAs with a single wake-up packet. Furthermore, the wake-up packet can be sent at two datarates: High Data Rate (HDR) and Low Data Rate (LDR). The data rate of LDR is equivalent to 62.5 kb/s and HDR is equivalent to 250 kb/s. STA implementations can support HDR, but LDR support is mandatory. A final nuance is the transition delay which is defined as the time required by the STA to transition from doze state to wake up state. This is an important operational metric since, depending upon the implementation, every STA can have different values (in steps of 256 µs) and has the maximum possible delay value of approximately ~65 ms. This per-STA delay is known to the access point during the WUR negotiation phase.

In short, the inventors have realized that there are additional, substantial energy savings to be had by utilizing GIDs in a more efficient manner. By efficiently grouping STAs under different GIDs the amount of time that a STA spends on the medium can be reduced. This reduction in time is short in absolute terms because the times involved are so small—microseconds or milliseconds at most. However, in relative terms the reduction in time may be as large as a few orders of magnitude. This saving may be realized through using preallocated GIDs and/or a STA capability based approach for GID assignment to STAs.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Figure 2:
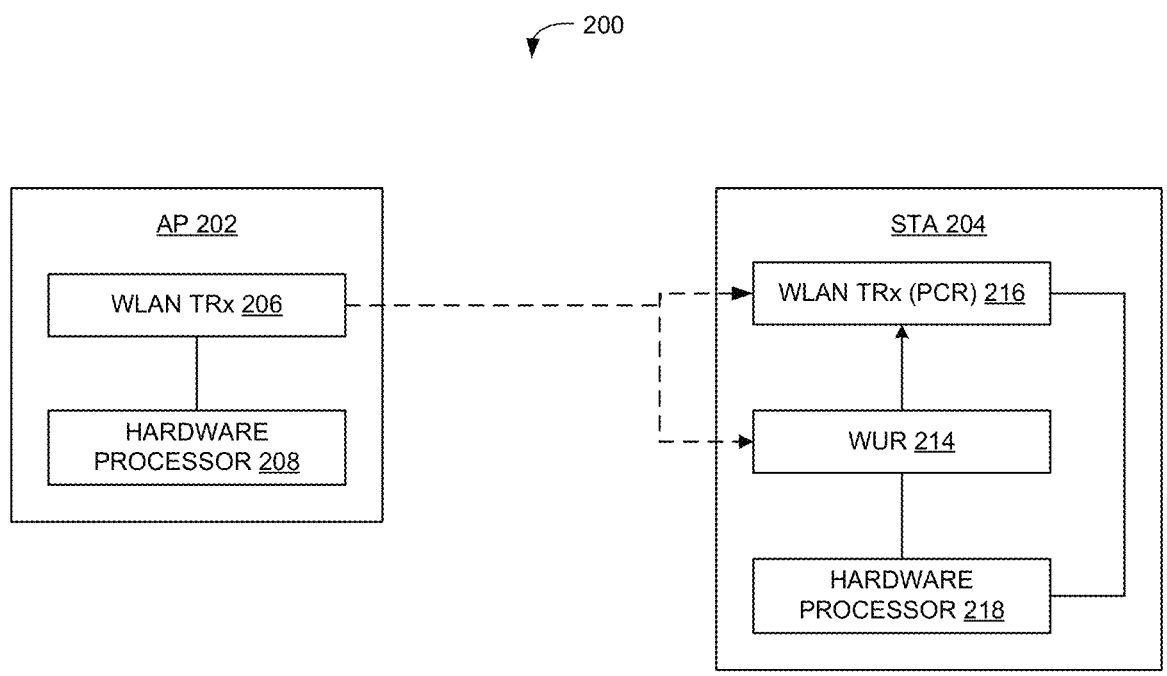
FIG. 2 depicts a communications system in accordance with one emobidment.

FIG. 2 depicts a communications system 200 in accordance with one embodiment. In the example implementation of FIG. 2, the communications system 200 includes an access point (AP) 202 and a STA 204. Although a single STA is shown in FIG. 2, any number of STA may be included, as may any number of APs. The AP 202 may be any device capable of executing the functions required of an access point. For example, the AP 202 may be implemented as an off-the-shelf device, as a smartphone acting as a hotspot, as a dedicated hotspot device, and the like.

The AP 202 includes a wireless local-area network (WLAN) transceiver (TRx) 206 and one or more antennas (not shown). The WLAN TRx 206 may be an IEEE 802.11ax transceiver. However, the WLAN TRx 206 may be any transceiver capable of supporting the functionality needed by the invention disclosed herein. The AP 202 may include a hardware processor 208 and associated hardware to perform functions described herein for the AP 202.

The STA 204 includes a WLAN transceiver TRx 216, a Wake-Up Radio (WUR) 214, and one or more antennas (not shown). The WLAN TRx 216 may be an IEEE 802.11ax Primary Connectivity Radio (PCR). However, the WLAN TRx 216 may be any transceiver capable of supporting the functionality needed by the invention disclosed herein. The WUR 214 may conform to IEEE 802.11ba, and/or any other suitable standard. The STA 204 may include a hardware processor 218 and associated hardware to perform functions described herein for the node 204.

Figure 3:
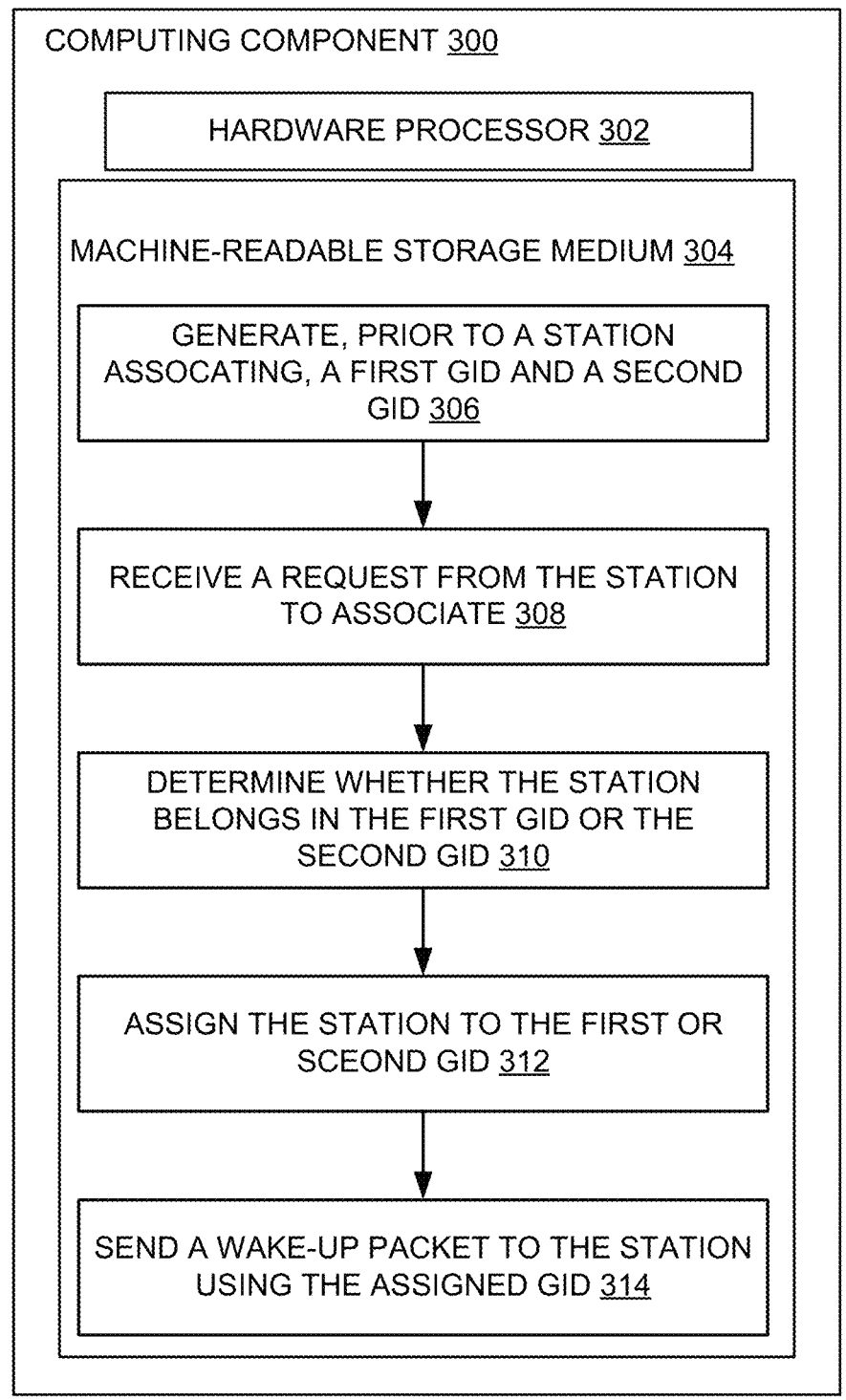
FIG. 3 is a block diagram of an example computing component or device for wake-up radio GID allocation in accordance with one embodiment.

FIG. 3 is a block diagram of an example computing component or device 300 for wake-up radio GID allocation, in accordance with one embodiment. Computing component 300 may be, for example, an access point, a server computer, a controller, or any other similar computing component capable of processing data. In the example implementation of FIG. 3, the computing component 300 includes a hardware processor, 302, and machine-readable storage medium, 304. In some embodiments, computing component 300 may be an embodiment of an AP or AP controller, e.g., AP 202, respectively, or a component of network 120 of FIG. 1, for example.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-314, to control processes or operations for wake-up radio GID allocation. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 302 may be a non-transitory storage medium, where the term "non-transitory" does not encompass transitory propagating signals. As described in detail below, machine-readable storage medium 302 may be encoded with executable instructions, for example, instructions 306-314.

Further, although the steps shown in FIG. 3 are in an order, the shown order is not the only order in which the steps may be performed. Any step may be performed in any order, at any time, may be performed repeatedly, and/or may be performed by any suitable device or devices. The process shown in FIG. 3 is also discussed in FIG. 4, at a differing level of detail.

In step 306, prior to a station associating, a first GID and a second GID are generated. The Group IDs (GID) may be generated in any manner, and/or in any format, at any time. In particular, the GIDs may be generated in a manner consistent with the IEEE 802.11ba or other suitable standard. The generated GIDs may be stored in any location or locations, and may be stored in any suitable format. The GIDs may be generated by an access point, or other suitable network device.

The first and second GID may be related to a same or similar factor or group, or may be related to a different factor or group. For instance, the GIDs may be related to: an entire BSS, an application or applications within a BSS, a geographical location or locations, aspects of stations such as whether or not a High Data Rate (HDR) is supported, a transition delay, or any other factor.

In step 308, a request is received from a station to associate. The request may be received in any manner, in any format, at any time. The request may be received by an access point or other suitable network device. The request may be consistent with IEEE 802.11 association requests, or any other standard. The association request may be processed and responded to in any suitable manner, such as consistent with IEEE 802.11.

In step 310, a determination is made whether the station belongs in the first GID or the second GID. The determination may be made by the access point to which the station is associating, or by any other suitable network device. The determination may be made at any time. The determination may be made, at least in part, based on information gathered during the association process. Alternatively, or in addition, the determination may be made based on information gathered at a different time or from a different process.

In step 312, the station is assigned to the first or second GID. The station may be assigned in any manner now known or later developed. Although only two GIDs are discussed in this example, any number of GIDs may be assigned to a station. Thus, for example, the station could be assigned to both the first GID and the second GID, just the first GID, just the second GID, or any other combination (depending on how many GIDs are available). This allows groups of related stations to be efficiently woken up by a single wake-up packet.

In step 314, a wake-up packet is sent to the station using the assigned GID. The wake-up packet may be sent in any manner now known, in any format, at any time. The wake-up packet may address any number of stations simultaneously. After receiving the wake-up packet, the primary communication radio (PCR) of the associated stations will be woken up, and transmissions on the PCR may proceed. Depending on whether the wake-up packet was received successfully by a subset of intended stations, a retransmission of the same packet or a new wake-up packet with a different GID which address another subset of stations (which did not wake up by the first frame) can be sent.

Figure 4:
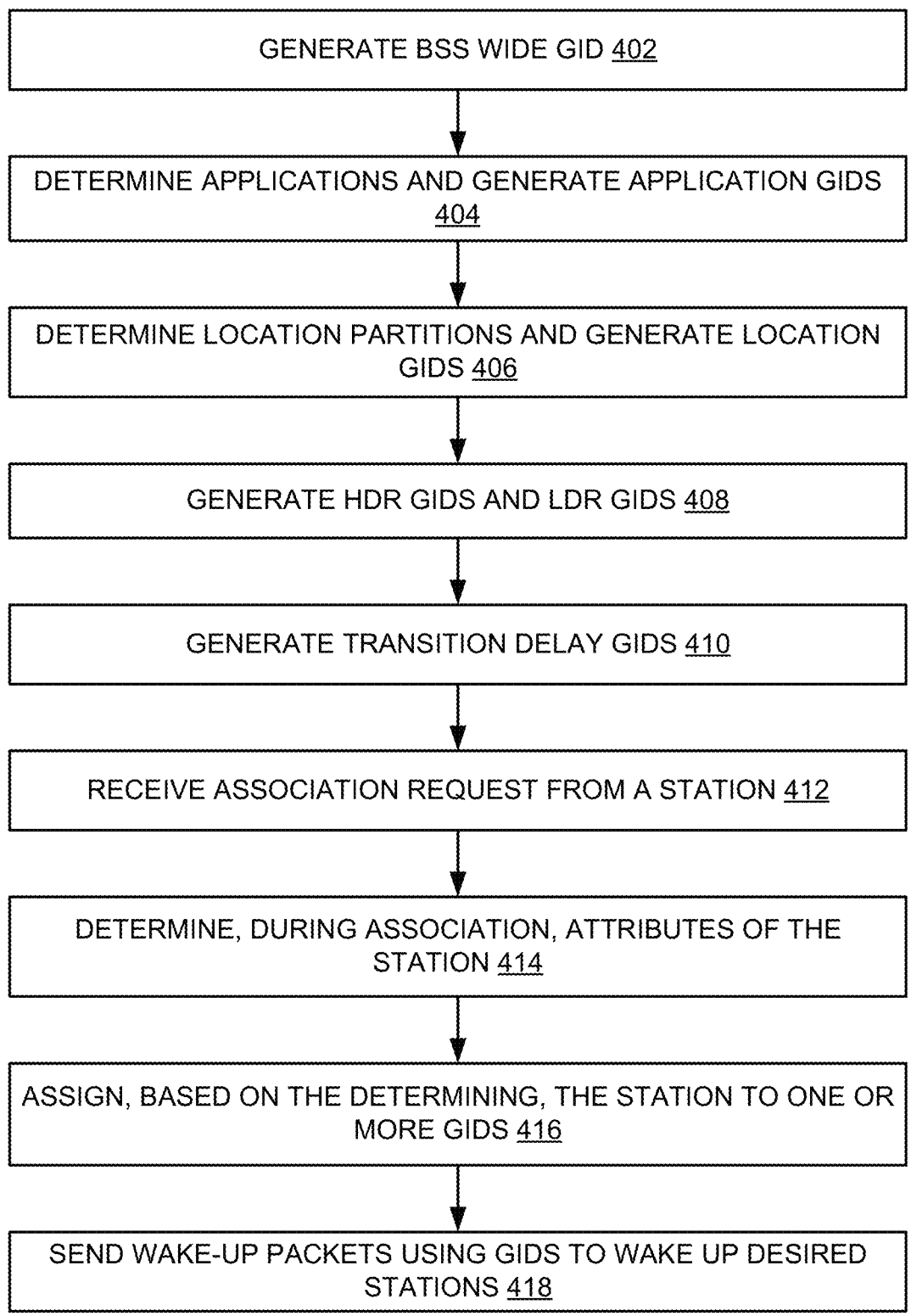
FIG. 4 is a flow chart of an example for wake-up radio GID allocation in accordance with one embodiment.

FIG. 4 depicts wake-up radio GID allocation in accordance with one embodiment. Although the steps shown in FIG. 4 are in an order, the shown order is not the only order in which the steps may be performed. Any step may be performed in any order, at any time, may be performed repeatedly, and/or may be performed by any suitable device or devices. The process shown in FIG. 4 is also discussed in FIG. 3, at a differing level of detail.

In step 402, a BSS wide GID is generated. As discussed above, the BSS wide GID may be generated in any manner and/or format, and may be stored in any manner and/or format. The purpose of a BSS wide GID is to wake up all stations for downlink broadcast traffic being received by the various stations, for operational BSS parameter changes, or for other reasons.

In step 404, applications on the BSS are determined and application GIDs are generated. As discussed above, the application GIDs may be generated in any manner and/or format, and may be stored in any manner and/or format. The use case for this preallocated GID is that the same GID should be assigned to each station performing a similar function. For example, on an enterprise floor proximity sensors for switching on the lights would be given one and security cameras on the perimeter would be given another. In case there is a device which does both, it should be assigned two GIDs, one for each function. There can be a prepopulated "device class" and when a station with a wake-up radio associates, it can be assigned the appropriate GID.

In step 406, location partitions are determined and location GIDs are generated. As discussed above, the location GIDs may be generated in any manner and/or format, and may be stored in any manner and/or format. The use case for this preallocated GID is that there might be some zones of interest which require a specific GID. These geographical zones would be key for some events happening locally. For the example above, the edge of the floor might constitute a zone where there would be automated Internet of Things (IoT) sensors for window blinds and also security cameras. A prerequisite for generating this GID would be a geographical to GID mapping which may be generated or received in any suitable manner, format, and/or time.

In step 408, High Data Rate (HDR) GIDs and Low Data Rate (LDR) GIDs are generated. This step, in particular, may be performed in a different order than shown in FIG. 4. Specifically, the GIDs used for data rates may be generated as stations associate to an access point, rather than ahead of time. Alternatively, or in addition, preallocated GIDs may also be used.

As discussed above, the data rate based GIDs may be generated in any manner and/or format, and may be stored in any manner and/or format. The use case for this preallocated GID is that HDR support is optional, while LDR support is mandatory. Thus, a HDR GID is one way to wake up a subset of another GID, or wake up stations that support HDR.

In step 410, transition delay GIDs are generated. This step, in particular, may be performed in a different order than shown in FIG. 4. Specifically, the GIDs used for transition delays may be generated as stations associate to an access point, rather than ahead of time. Alternatively, or in addition, preallocated GIDs may also be used. For example, if a station associates with a transition time of t1, and no GID yet exists for transition time t1 (or existing GIDs are too crowded, etc), then a new GID may be generated during association of the station.

As discussed above, the transition delay GIDs may be generated in any manner and/or format, and may be stored in any manner and/or format. The use case for this GID is that stations have a transition delay from the time they receive the wake-up packet to the time the primary 802.11 radio is woken up which can be in the order of milliseconds. Therefore, if the use case is such that the access point wakes up the station for sending downlink buffered traffic, then a transition delay matching approach should be used. This means stations with the same or close to the same transition delay should be grouped together in the same GID. This has the effect of the stations waking up to receive data from the access point (possibly in an 802.11ax Multi-User PLCP Protocol Data Unit or a broadcast or multicast frame).

On the other hand, if the use case is such that the stations need to send data on the uplink, then staggering the transition delays would provide maximum power savings. Here, the access point can sort stations by the transition delay times in an ascending order. Then a subset of those can be selected to be grouped under a single GID such that no two stations that are grouped together have transition delay times less than $\Delta t$ ($\Delta t$ is the difference between two delay times and is $\geq 256$ µs). Since the minimum difference between two stations is 256 µs, there will be less contention on the uplink to send frames (and simultaneously maximizing the power savings of the stations.) For both of these transition delay use cases, the stations can be grouped under as many GIDs as desired to provide maximum flexibility.

In step 412, an association request is received from a station. The association request may be received as discussed with regards to FIG. 3.

In step 414, attributes of the station are determined during association. The attributes of the station may be any attribute or aspect including, but not limited to, station type or class, whether the station supports HDR, station location, station transition delay, device and/or OS type by device fingerprinting methods, etc. The attributes may be determined in any manner now known or later developed, and may be determined at any time, including after association.

In step 416, the station is assigned to one or more GIDs, based on the determining. A station may be assigned to any number of stations, in any manner.

In step 418, wake-up packets are sent to desired stations using the GIDs. The wake-up packets may be sent at any time, in any format. The wake-up packets may be consistent with the 802.11ba standard, or any other standard. Any number of wake-up packets may be sent, targeting any set(s) or subset(s) of stations. The wake-up packets are not limited to simply targeting entire GIDs. Rather, subsets of GIDs may be targeted by cross-referencing or comparing the members of one GID to another, and sending a wake-up packet only to the stations that were members of both GIDs (or only one GID), or any other combination.

Figure 5:
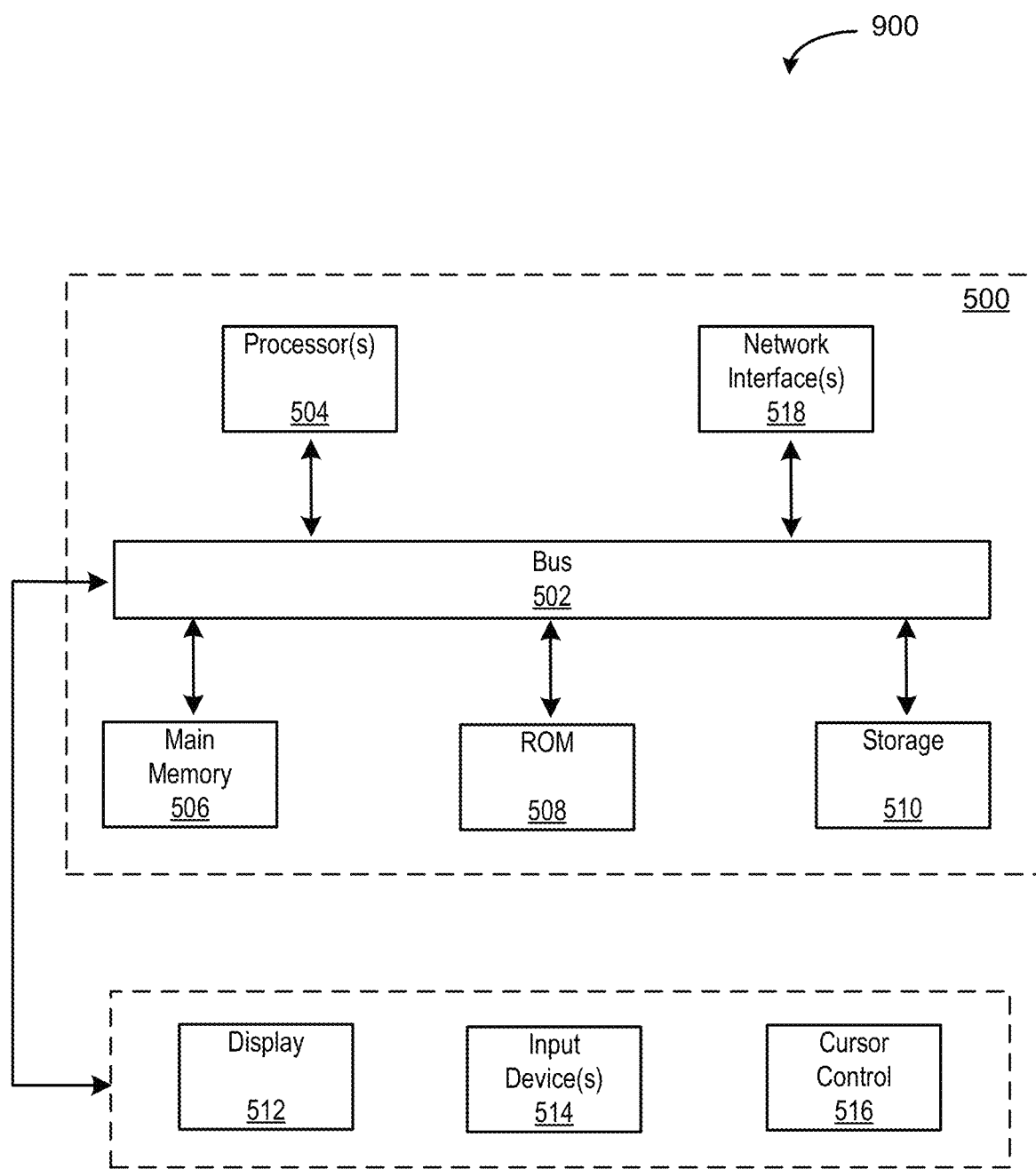
FIG. 5 depicts a block diagram of an example computer system in which the embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    generating, by an access point and prior to a station associating to the access point, a first Group-ID and a second Group-ID, wherein the station comprises a Wake-Up Radio;
    receiving, by the access point, a request from the station to associate;
    determining, by the access point, whether the station belongs in the first Group-ID or the second Group-ID;
    assigning, by the access point and based on the determining, the station to the first Group-ID; and
    sending, by the access point, a Wake-Up Packet to the Wake-Up Radio of the station using the first Group-ID;
    generating, by the access point, a third Group-ID and a fourth Group-ID, wherein the third Group-ID is for stations that support a Low Data Rate, and wherein the fourth Group-ID is for stations that support a High Data Rate;
    determining, by the access point, that the station supports the Low Data Rate and the High Data Rate; and
    assigning, by the access point, the station to the third Group-ID and the fourth Group-ID.

2. The method of claim 1, wherein the first Group-ID is for an entire Basic Service Set.

3. The method of claim 2, wherein the second Group-ID is for an application within the Basic Service Set.

4. The method of claim 1, further comprising:
    generating, by the access point, a fifth Group-ID and a sixth Group-ID, wherein the fifth Group-ID is for stations with a first transition delay, and wherein the sixth Group-ID is for stations with a second transition delay;
    determining, by the access point, that the station comprises the first transition delay; and
    assigning, by the access point, the station to the fifth Group-ID.

5. The method of claim 1, further comprising:
    generating, by the access point, a seventh Group-ID, wherein the seventh Group-ID is for grouping stations such that each station assigned to the seventh Group-ID has a minimum difference of transition delay between other stations in the seventh Group-ID of 256 microseconds;

determining, by the access point, that a transition delay of the station has a minimum difference of greater than 256 microseconds with other stations of the seventh Group-ID; and assigning, by the access point, the station to the seventh Group-ID.

6. The method of claim 1, wherein the second Group-ID is for a geographical zone.

7. An access point, comprising:

a processor; and a memory storing instructions which, when executed by the processor, cause the processor to:

generate, prior to a station associating to the access point, a first Group-ID and a second Group-ID, wherein the station comprises a Wake-Up Radio;

receive a request from the station to associate;

determine whether the station belongs in the first Group-ID or the second Group-ID;

assign, based on the determining, the station to the first Group-ID; and send a Wake-Up Packet to the Wake-Up Radio of the station using the first Group-ID;

generate a third Group-ID and a fourth Group-ID, wherein the third Group-ID is for stations that support a Low Data Rate, and wherein the fourth Group-ID is for stations that support a High Data Rate;

determine that the station supports the Low Data Rate and the High Data Rate; and assign the station to the third Group-ID and the fourth Group-ID.

8. The access point of claim 7, wherein the first Group-ID is for an entire Basic Service Set.

9. The access point of claim 8, wherein the second Group-ID is for an application within the Basic Service Set.

10. The access point of claim 7, the instructions further causing the processor to:

generate a fifth Group-ID and a sixth Group-ID, wherein the fifth Group-ID is for stations with a first transition delay, and wherein the sixth Group-ID is for stations with a second transition delay;

determine that the station comprises the first transition delay; and assign the station to the fifth Group-ID.

11. The access point of claim 7, the instructions further causing the processor to:

generate a seventh Group-ID, wherein the seventh Group-ID is for grouping stations such that each station assigned to the seventh Group-ID has a minimum difference of transition delay between other stations in the seventh Group-ID of 256 microseconds;

determine that a transition delay of the station has a minimum difference of greater than 256 microseconds with other stations of the seventh Group-ID; and assign the station to the seventh Group-ID.

12. The access point of claim 7, wherein the second Group-ID is for a geographical zone.

13. A non-transitory computer readable medium comprising instructions which, when executed by a processor, causes the processor to:

generate, prior to a station associating to the access point, a first Group-ID and a second Group-ID, wherein the station comprises a Wake-Up Radio;

receive a request from the station to associate;

determine whether the station belongs in the first Group-ID or the second Group-ID;

assign, based on the determining, the station to the first Group-ID; and send a Wake-Up Packet to the Wake-Up Radio of the station using the first Group-ID;

generate a third Group-ID and a fourth Group-ID, wherein the third Group-ID is for stations that support a Low Data Rate, and wherein the fourth Group-ID is for stations that support a High Data Rate;

determine that the station supports the Low Data Rate and the High Data Rate; and assign the station to the third Group-ID and the fourth Group-ID.

14. The non-transitory computer readable medium of claim 13, wherein the first Group-ID is for an entire Basic Service Set.

15. The non-transitory computer readable medium of claim 13, wherein the second Group-ID is for an application within the Basic Service Set.

16. The non-transitory computer readable medium of claim 13, the instructions further causing the processor to:

generate a fifth Group-ID and a sixth Group-ID, wherein the fifth Group-ID is for stations with a first transition delay, and wherein the sixth Group-ID is for stations with a second transition delay;

determine that the station comprises the first transition delay; and assign the station to the fifth Group-ID.

17. The non-transitory computer readable medium of claim 13, the instructions further causing the processor to:

generate a seventh Group-ID, wherein the seventh Group-ID is for grouping stations such that each station assigned to the seventh Group-ID has a minimum difference of transition delay between other stations in the seventh Group-ID of 256 microseconds;

determine that a transition delay of the station has a minimum difference of greater than 256 microseconds with other stations of the seventh Group-ID; and assign the station to the seventh Group-ID.

\* \* \* \* \*